US008023800B2

(12) United States Patent
Concotelli

(10) Patent No.: US 8,023,800 B2
(45) Date of Patent: Sep. 20, 2011

(54) MEDIA PLAYBACK SYSTEM

(76) Inventor: Steve Concotelli, Los Angeles, CA (US)

( * ) Notice: Subject to any disclaimer, the term of this patent is extended or adjusted under 35 U.S.C. 154(b) by 1126 days.

(21) Appl. No.: 11/821,371

(22) Filed: Jun. 20, 2007

(65) Prior Publication Data

US 2008/0124056 A1    May 29, 2008

Related U.S. Application Data

(60) Provisional application No. 60/816,291, filed on Jun. 23, 2006, provisional application No. 60/901,979, filed on Feb. 17, 2007.

(51) Int. Cl.
*H04N 5/76* (2006.01)
(52) U.S. Cl. .......................... 386/291; 386/296
(58) Field of Classification Search .......... 386/291–293, 386/296–297
See application file for complete search history.

(56) References Cited

U.S. PATENT DOCUMENTS

| | | | |
|---|---|---|---|
| 5,818,439 A * | 10/1998 | Nagasaka et al. | 725/87 |
| 6,240,555 B1 * | 5/2001 | Shoff et al. | 725/110 |
| 6,732,210 B1 | 5/2004 | Mathieson | |
| 6,847,365 B1 | 1/2005 | Miller | |
| 6,871,008 B1 | 3/2005 | Pintz | |
| 7,440,674 B2 * | 10/2008 | Plotnick et al. | 386/343 |
| 7,519,273 B2 * | 4/2009 | Lowthert et al. | 386/248 |
| 7,640,560 B2 * | 12/2009 | Logan et al. | 725/32 |
| 7,735,104 B2 * | 6/2010 | Dow et al. | 725/52 |
| 2002/0089519 A1 | 7/2002 | Betz | |
| 2002/0090201 A1 | 7/2002 | Betz | |
| 2002/0106191 A1 | 8/2002 | Betz | |
| 2005/0005308 A1 * | 1/2005 | Logan et al. | 725/135 |

* cited by examiner

*Primary Examiner* — Thai Tran
*Assistant Examiner* — Nigar Chowdhury
(74) *Attorney, Agent, or Firm* — Tope-McKay & Associates; Marcus Risso

(57) ABSTRACT

Described is a system and method for assigning, controlling and triggering playback of multiple media streams in a manner so that the media streams perform in sync, as defined by parameters specified by the user. The system allows users to generate and acquire new content for playback with an original program. Further, the system allows users to upload the new content to an internet accessible database for download and use by other users.

48 Claims, 10 Drawing Sheets

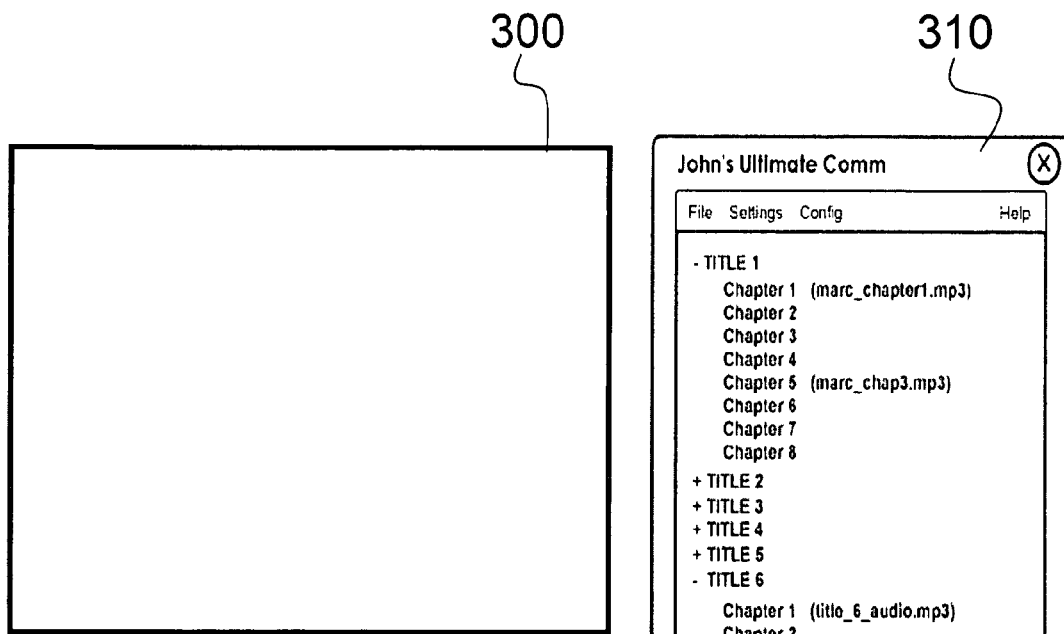
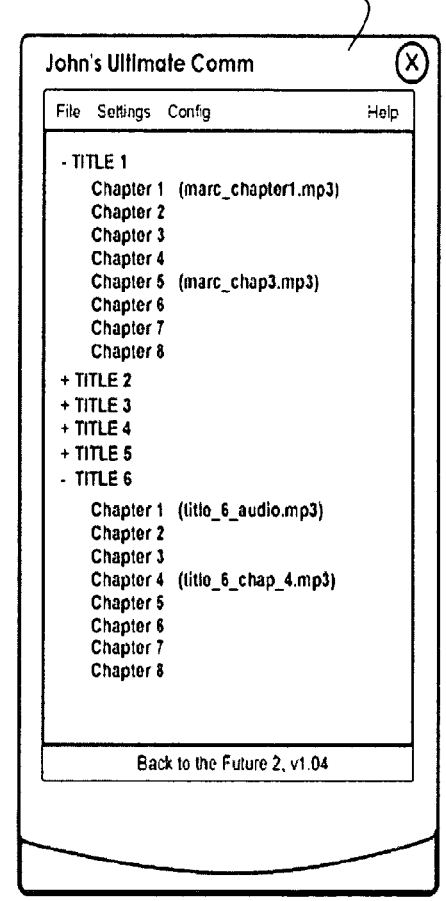
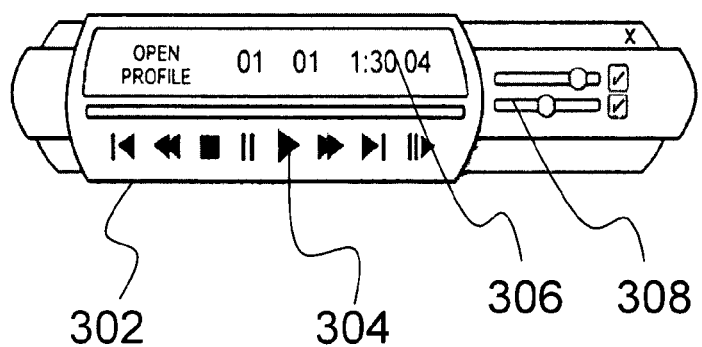
FIG. 3A
FIG. 3B
FIG. 3C

MEDIA PLAYBACK SYSTEM

PRIORITY CLAIM

The present application is a non-provisional patent application, claiming the benefit of priority of U.S. Provisional Application No. 60/816,291, filed Jun. 23, 2006, entitled, "Media Playback System," and also claiming the benefit of priority of U.S. Provisional Application No. 60/901,979, filed on Feb. 17, 2007, entitled, "Media Playback System."

FIELD OF INVENTION

The present invention relates to a media playback system and, more particularly, to a system and method for assigning, controlling and triggering playback of multiple media streams in a manner so that the media streams perform in sync, as defined by parameters specified by the user.

BACKGROUND OF INVENTION

Over recent years, digital versatile disc (DVD) commentaries have become increasingly common. Directors, writers and actors often record audio commentaries for movies they work on. These commentaries reside on the DVD and can be listened to as the viewer watches the DVD.

Some inventive movie fans have begun recording their own "alternative commentaries" and releasing them over the internet. However, there is currently no program that allows these alternate commentaries to be played back in sync with the DVD. Currently, users must use two different programs (a DVD player and a separate audio player). In using the two separate programs, the user must manually begin one program then manually begin the other. Using this method, alternate commentaries cannot be precisely synced up with the DVD. In addition, once both devices are playing, the user cannot fast-forward, stop, rewind, or pause the DVD without losing sync with the alternate commentary.

In addition, movie fans have also begun re-editing scenes from movies and television shows, and distributing them over the internet. The re-edited scenes are typically called a "mashup." These mashups can vary greatly. For example, some users take scenes from a movie and re-edit them together in order to make a comedic/alternate version of a trailer for the movie. An example is "The Shining" re-cut, found at http://www.youtube.com/watch?v=KmkVWuP_sO0&feature=PlayList&p=4786AAD39DC176EB&index=1, taken on Jun. 12, 2007. In this case, the user edited together scenes from "The Shining," along with additional voice over and graphics in order to create a parody trailer for "The Shining" that made the film appear to be a romantic comedy.

As another example of a "mashup," users combine multiple movies or television shows in order to create new, unique and humorous video clips. An example of this is "Jack Bauer interrogates Chunk," which can be found at http://www.youtube.com/watch?v=QhXRSf5yays, taken on Jun. 12, 2007. In this mashup, a user has edited together clips from the movie "Goonies" and the television show "24" in order to give the impression that characters from both movies are interacting together.

As yet another example of a mashup, some users have created extremely complex re-edits, which include inserting new material directly into scenes of a movie or television show. Instead of merely editing clips together, these users utilize complex editing and compositing techniques to digitally insert new images into a scene from a movie or television show. An example of this is "Stromberg meets Hollywood," which can be found at http://www.youtube.com/watch?v=7t-7K9EUcdo, taken on Jun. 17, 2007. In this mashup, a user has inserted a new character into existing scenes from several movies.

It should be noted that distributing mashups is often illegal because the material involved is copyrighted. Thus, existing systems potentially expose the users and service provides to copyright lawsuits in that they enable the download of copyrighted material. Therefore, it is desirable to have a system that allows for the generation and distribution of mashups without violating existing copyrights or digital rights management (DRM).

Additionally, U.S. patent application Ser. No. 10/040,741 (hereinafter referred to as the '741 application), entitled, "Systems and methods for creating an annotated media presentation," describes a system for adding commentary elements onto a DVD. However, the '741 application provides a complicated and undesirable solution. More specifically, the '741 application describes an authoring program that is designed to create custom made DVD's, which can only be properly viewed by using specialized DVD players able to read the additional code.

Another fallback to the prior art is that it does not address the issue of playing separate media streams in sync, because the process of recording the information onto the DVD binds all media streams together. In effect, the DVD becomes one media stream and "sync" is no longer an issue. Thus, the additional elements cannot be adjusted or removed.

As technology has advanced, so have the media platforms and providers. For example, in the past few years, downloading movies and television shows from the Internet has become increasingly popular. Many existing businesses have websites that offer a variety of downloadable content, ranging from television (TV) shows to feature films. Other services, such as TiVo and Apple TV, use digital video recorders (DVR's) that allow users to download similar content to a set-top box. TiVo is produced by Tivo, Inc., located at 2160 Gold Street, P.O. Box 2160, Alviso, Calif. 95002-2160. Alternatively, Apple TV is produced by Apple, Inc., located at One Infinite Loop, Cupertino, Calif. 95014.

Thus, digital media downloading is now commonplace. However, as was the case with the DVD format, no existing system allows a user to download the media and sync an independent commentary with the original program or media. Therefore, a continuing need exists for a system that allows users to download and play alternative content in sync with a DVD and/or other form of media, such as downloaded media. In addition, no existing system allows a user to create and distribute mashups without violating DRM or copyright laws. Therefore, a continuing need exists for a system that allows users to create, distribute, download, and play mashups in a manner that does not violate DRM or copyright laws.

SUMMARY OF INVENTION

The present invention relates to a media playback system, method, and computer program product. The present invention is operable for performing a variety of acts and operations, including acquiring new content having playback preferences that determine how an original program(s) should be played; assigning the new content to an original program; and playing the original program as determined by the playback preferences. Thus, using the playback preferences, a user can play the original program according to the playback preferences.

In another aspect, the present invention further comprises an act of generating new content.

In yet another aspect, the act of generating new content further comprises acts of:
  creating at least one media element, the media element being selected from a media group consisting of audio, graphics, text, and video;
  defining a playback preference of the new content, the playback preference including playback information selected from a group consisting of:
    information which indicates a start time and stop time of each media element;
    information dictating an order in which the new content is to be played;
    information defining how the original program and the new content will be played together;
    information defining volume levels of each media element;
    information defining an image alteration of the new content, the image alteration being selected from a group consisting of an orientation effect, re-size effect, shape change effect, reposition effect, color level change effect and a luminance change effect;
    information defining playback speeds and directions of the new content, the playback speed and direction being selected from a group consisting of slow-motion, freeze-frame, fast-motion, and reverse-play;
    information defining an audio alteration of the new content; and
  defining a descriptive element for the new content, the descriptive element being selected from a group consisting of a new content name, a descriptive summary of the new content, a list of compatible original programs, generator's identification information, duration of the new content, and price of the new content.

In another aspect, the act of generating new content further comprises acts of:
  defining a playback preference of the original program, the playback preference including playback information selected from a group consisting of:
    information which indicates how the original program will be played in association with the new content;
    information dictating an order in which portions of the original program are to be played;
    information including instructions as set forth in an Edit Decision List;
    information defining volume levels of the original program(s);
    information defining an image alteration of the original program, the image alteration being selected from a group consisting of an orientation effect, re-size effect, shape change effect, reposition effect, color level change effect and a luminance change effect;
    information defining a playback speed and direction of the original program, the playback speed and direction being selected from a group consisting of slow-motion, freeze-frame, fast-motion, and reverse-play; and
    information defining an audio alteration of the original program.

Additionally, the present invention further comprises acts of:
  determining if a user desires to watch an original program, if yes, then loading the original program;
  determining if new content is available for the original program;
    if new content is not available, then playing the original program alone;
    if new content is available, then determining if the user desires to watch the original program with the new content;
      if the user desires to watch the original program without the new content, then removing any assigned new content tracks and playing the original program alone;
      if the user desires to watch the original program with the new content, then determining if the new content currently available to the original program is correctly assigned to the original program;
        if the new content is correctly assigned to the original program, then playing the new content and original program together;
        if the new content currently available to the original program is incorrectly assigned to the original program,
      then removing any undesired new content;
  determining if the user possesses desired new content;
    if the user does not possess desired new content, then:
      browsing an internet accessible catalog of new content;
      downloading the desired new content; and
      adding the desired new content to the original program,
    with the new content and original program thereafter playing together;
    if the user does possess the desired new content, then:
      selecting the desired new content; and
      adding the desired new content to the original program,
    with the new content and original program thereafter playing together;
  determining if a user desires to change the new content currently added to the original program;
    if the user desires to change the new content, then returning to the act of determining if new content is available for the original program; and
    if the user does not desire to change the new content, then either continuing playback or stopping playback.

Furthermore, the act of determining if new content is available for the original program further comprises an act of checking the original program against an internet accessible database having a catalog of new content for syncing with original programs to determine if new content exists for the original program.

Additionally, the act of acquiring new content further comprises an act of downloading the new content from an internet accessible database.

In yet another aspect, the act of acquiring new content further comprises an act of purchasing the new content from an internet accessible database for download from the internet accessible database.

In another aspect, the new content includes a media element selected from a group consisting of an audio commentary, a video overlay, and an advertisement. The audio commentary is formed to play in conjunction with the original program. The video overlay plays in conjunction with the original program such that it plays superimposed over the original program. Finally, the advertisement plays in conjunction with the original program.

In another aspect, the advertisement includes both a video image and a text overlay that collectively plays in conjunction with and superimposed over the original program.

In yet another aspect, new content includes instructions that alter a playback of the original program. The original program includes an appearance, audio, a playback chronology, and a playback speed. Additionally, the instructions are selected from a group consisting of:
- instructions that alter the appearance of the original program;
- instructions that alter the audio of the original program;
- instructions that alter the playback chronology of the original program; and
- instructions that alter the playback speed of the original program.

In yet another aspect, the new content includes instructions selected from a group consisting of:
- instructions that alter the appearance of the new content;
- instructions that alter the audio of the new content;
- instructions that alter the playback chronology of the new content;
- instructions that alter the playback speed of the new content;
- instructions that combine elements from multiple original programs such that the multiple original programs are combined and play together as a modified program.

In another aspect, the present invention further comprises an act of assigning multiple streams of new content to an original program such that the multiple streams of new content and the original program are combined and played together as a modified program.

Additionally, the present invention further comprises an act of assigning multiple streams of new content to multiple original programs such that the multiple streams of new content and the original programs are combined into a singular playback stream.

In yet another aspect, the present invention is configured to perform acts of generating new content that is formed to play in sync with the original program; and uploading the new content to an internet accessible database for use by other users.

Additionally, the present invention further comprises acts of:
- acquiring new content for playback with an original program;
- acquiring playback preferences that determine how the new content should be played;
- assigning the new content to the original program, as determined by the playback preferences; and
- playing the new content and original program together as determined by the playback preferences.

In yet another aspect, the present invention further comprises an act of acquiring an original program.

Additionally, the present invention is a computer program product comprising computer-readable instruction means encoded on a computer-readable medium for causing a computer to perform the operations described herein. Finally, as can be appreciated by one skilled in the art, the present invention also comprises a method and system for performing the said operations.

BRIEF DESCRIPTION OF THE DRAWINGS

The objects, features and advantages of the present invention will be apparent from the following detailed descriptions of the various aspects of the invention in conjunction with reference to the following drawings, where:

FIG. 3A is an illustration of a display window according to the present invention;

FIG. 3B is an illustration of a control bar according to the present invention;

FIG. 3C is an illustration of file window according to the present invention;

DETAILED DESCRIPTION

Figure 1:
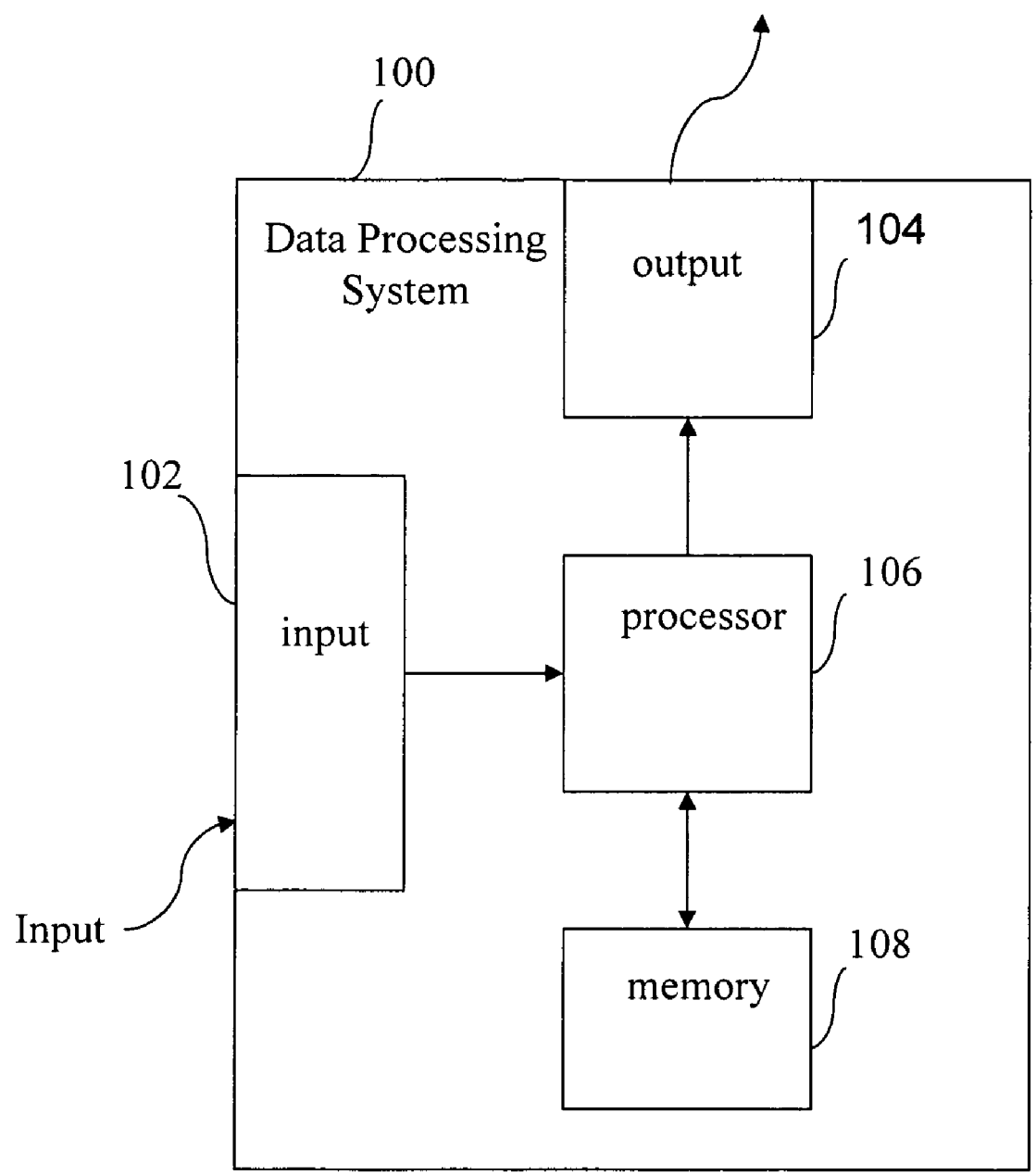
FIG. 1 is a block diagram illustrating a media playback system according to the present invention.

The present invention relates to a media playback system and, more particularly, to a system and method for assigning, controlling and triggering playback of multiple media streams in a manner so that the media streams perform in sync, as defined by parameters specified by the user. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a glossary of terms used in the description and claims is provided. Next, a description of various principal aspects of the present invention is provided. Subsequently, an introduction provides the reader with a general understanding of the present invention. Finally, details of the present invention are provided to give an understanding of the specific aspects.

(1) Glossary

Before describing the specific details of the present invention, a glossary is provided in which various terms used herein and in the claims are defined. The glossary provided is intended to provide the reader with a general understanding of the intended meaning of the terms, but is not intended to convey the entire scope of each term. Rather, the glossary is intended to supplement the rest of the specification in more accurately explaining the terms used.

Instruction Means—The term "instruction means" as used with respect to this invention generally indicates a set of operations to be performed on a computer, and may represent pieces of a whole program or individual, separable, software modules. Non-limiting examples of "instruction means" include computer program code (source or object code) and "hard-coded" electronics (i.e. computer operations coded into a computer chip). The "instruction means" may be stored in the memory of a computer or on a computer-readable medium such as a floppy disk, a CD-ROM, and a flash drive.

Modified Program—The term "modified program" as used with respect to the present invention generally refers to a synced program that includes both "original program(s)" and "new content."

New Content—The term "new content" as used with respect to this invention generally refers to at least one additional media element that is being synced with the "original program," non-limiting examples of such new content includes subtitles, audio commentaries, video overlays, text, advertisements, pop-ups, graphic overlays, etc. The new content also includes instructions (playback preferences) that determine how the new content and the original program are played in association with each other. New content can also comprise instructions (playback preferences) that alter the playback of the original program or programs, through video manipulation, audio manipulation, playback speed manipulation and chronology manipulation.

Original Program—The term "original program" or "program" as used with respect to this invention describes any film, television show, copyrighted material, or similar audio-visual experience that a user may wish to obtain additional content for. The original program may exist on a computer, set-top-box device, storage device (such as a DVD/HD-DVD/Blu-Ray, etc.), remote computer, or other storage means.

(2) Principal Aspects

The present invention has three "principal" aspects. The first is a media playback system. The media playback system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions means stored on a computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting the components of a media playback system of the present invention is provided in FIG. 1. The media playback system 100 comprises an input 102 for receiving information from a user and for receiving media from a variety of sources. Note that the input 102 may include multiple "ports." Typically, input is received from a user and/or media source. An output 104 is connected with the processor for playing synced media. Output may also be provided to other devices or other programs; e.g., to other software modules, for use therein. The input 102 and the output 104 are both coupled with a processor 106, which may be a general-purpose computer processor or a specialized processor designed specifically for use with the present invention. The processor 106 is coupled with a memory 108 to permit storage of data and software that are to be manipulated by commands to the processor 106.

Figure 2:
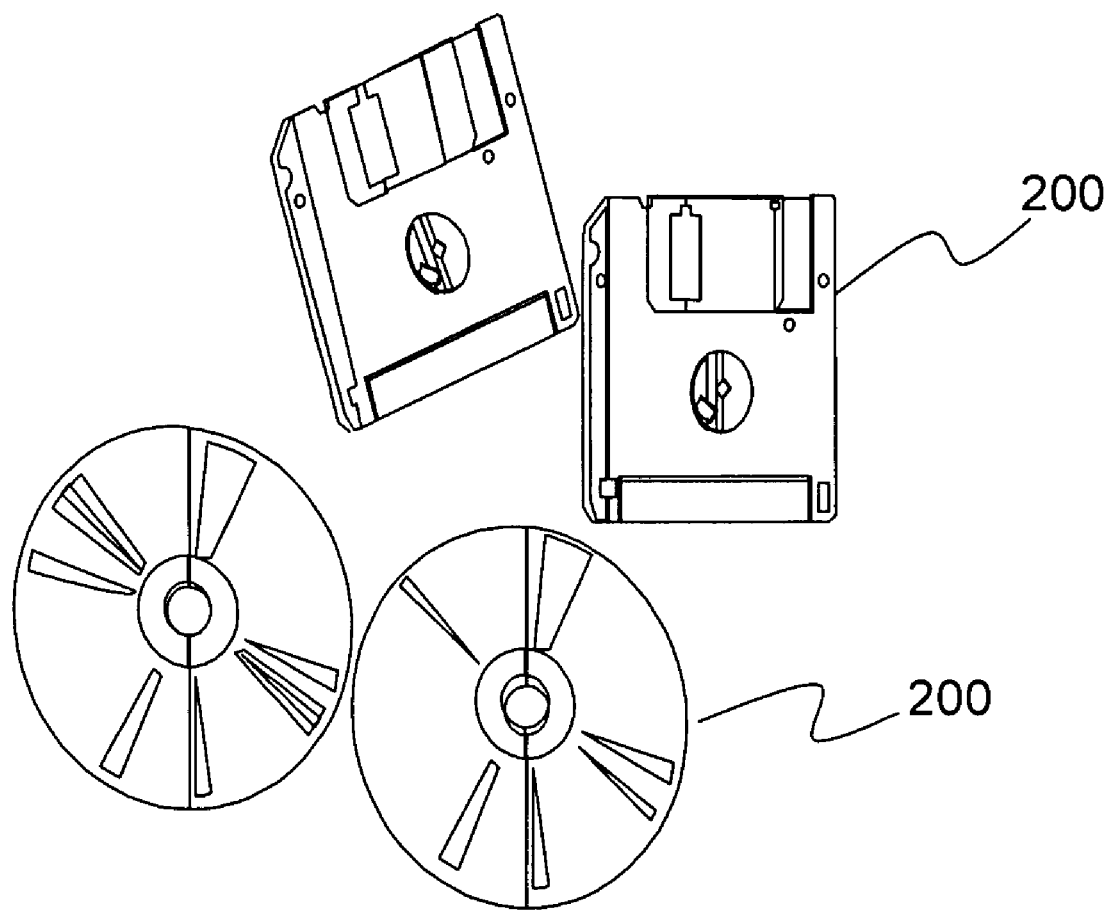
FIG. 2 is an illustration of a computer program product according to the present invention.

An illustrative diagram of a computer program product embodying the present invention is depicted in FIG. 2. The computer program product 200 is depicted as an optical disk such as a CD or DVD. However, as mentioned previously, the computer program product generally represents computer-readable instructions stored on any compatible computer-readable medium.

(3) Introduction

In recent years, DVD commentaries have become increasingly common. Directors, writers and actors often record audio commentaries for movies they work on. These commentaries often reside on the DVD and can be listened to as the viewer watches the DVD. However, as described above, a need exists to allow users to record, play, and distribute their own alternative commentaries and content (i.e., new content). The present invention solves this need by providing a system that allows users to play the new content in sync with an original program. The original program typically resides on a DVD, computer, set-top box, or other form of media (such as media downloaded from the internet). Thus, the present invention allows a user to assign alternate audio/visual material to any portion of the original program. The software then uses information from the original program, the new content, and parameters defined by the user in order to play the new content in sync with the original program as a modified program.

Thus, the present invention is a system for triggering multiple media streams to playback in sync. Additionally, the present invention is configured to operate with media streams from different sources, such as media files, internet streaming videos, and DVD's. The present invention includes the way that these separate media streams must be controlled and triggered, in order for them to play back in sync.

(4) Details of the Invention

New content is any suitable media that can be combined with another source of media, non-limiting examples of which include graphics (typically subtitles, advertisements, or pop-ups), audio (typically in the form of a running commentary or overdub), video (typically in the form of an overlay or picture-in-picture format), video related information (such as mattes, alpha channels, etc.), information which may alter the program's image (such as color effects and resizing effects), alter the sound of the original program (such as reverb effects, volume changes, etc), alter the chronology of the original program, or alter the playback speed of the original program.

It should also be noted that the present invention is not limited to the system used to sync the original program with the new content, but also includes software for use in a variety of platforms that causes media streams to be synced.

As mentioned above, the alteration or distribution of an original or modified program can, in some cases, be determined to be a copyright violation. Therefore, it is desirable to have a system that allows for the generation and distribution of new content for use with an original program (e.g., to create a "mashup") without violating existing copyrights or digital rights management (DRM). The present system is the first to address this issue, by making it possible for movie fans to distribute "mashups" across the internet legally. It does this by allowing users to upload and share only the non-copyrighted material (referred to as the 'new content'). Instead of uploading copyrighted material (as is common now), the present invention only uploads specific timing information about the original program, thereby not violating any copyright or DRM.

The present invention allows users to create these "mashups" using multiple original programs, along with new content that they provide, such as voice over, graphics, video, and timing elements which can alter the chronology of the original program or programs.

In order for the process to work, users can download new content, but they must possess their own copy of the original content (the copyrighted material) in order for the mashup to play back properly.

In operation, the present invention includes a user interface, such as a graphical user interface. The user interface is operable for allowing a user to sync the original program with new content to generate a modified program (synced multiple media streams). As shown in FIG. 3A, the present invention utilizes a video display window 300 for playing the synced multiple media streams. The video display window 300 can be a user's computer monitor, television, or any other display device capable of displaying a received signal.

As shown in FIG. 3B, a control bar 302 is included. The control bar 302 includes any necessary controls to allow a user to control the media playback system. For example, the control bar 302 includes original program (e.g., DVD) controls 304 (such as play, pause, etc.), a status display 306, and separate audio controls 308 for each of the original program and the new content.

Additionally, as shown in FIG. 3C, a file window 310 can be used to allow a user to assign new content to an original program. For example, the file window 310 includes a display/list containing a representation of the original program's title and chapter structure. The file window 310 also includes a display/list of the currently assigned new content (in this case, .mp3 files). Also provided is a system for adjusting the new content and playback preferences. As can be appreciated by one skilled in the art, such adjustment controls are hidden (yet accessible) within the menu of the file window. Finally, the file window 310 includes a system for adjusting the original program's playback preferences. As can be appreciated by one skilled in the art, the control bar 302 and file window 310 were used for illustrative purposes only as the invention is not intended to be limited thereto. For example, one can appreciate a variety of control features which would result in different control bar 302 than illustrated. Further, depending on the file and media type, the file window 310 can be altered to reflect and adjust the appropriate content. The File Window 310 also provides a way for users to load new content that already contains the necessary playback and sync information, eliminating the need to assign new content elements manually.

Figure 4:
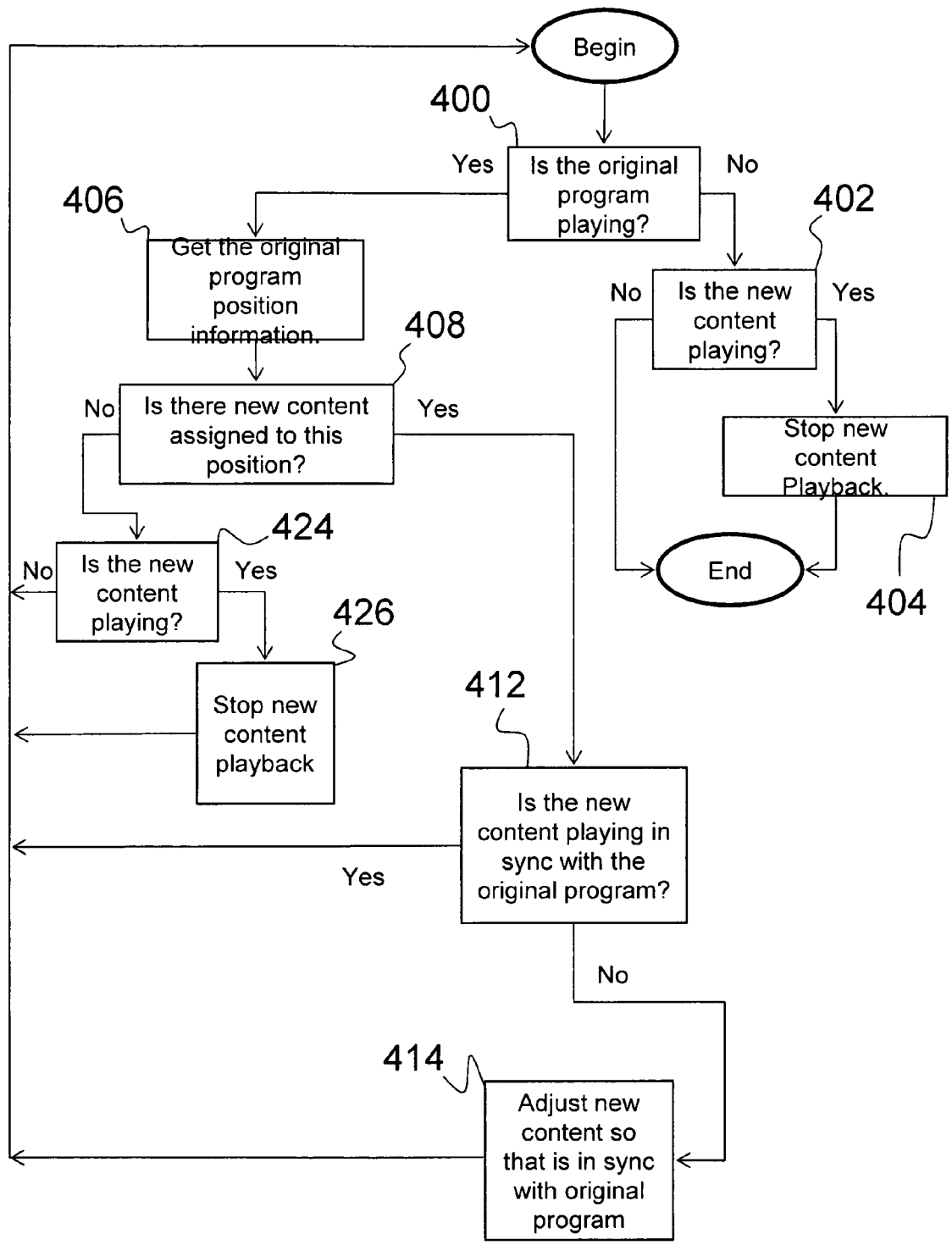
FIG. 4 is a flowchart illustrating a system for syncing an original program with new content to generate a modified program, according to the present invention.

As described above, the present invention is a system for syncing an original program with new content to create a modified program. FIG. 4 illustrates a flowchart of one possible incarnation of the system that controls the playback of modified program (i.e., the original program (e.g., DVD) with the synced new content (e.g., audio files)).

First, the system determines if an original program is playing 400. If the original program is not playing, the system determines if any assigned new content file is playing 402. If the new content is playing, the program stops the playback of the new content 404, then returns to the procedure illustrated in FIG. 5. Otherwise, if the new content is not playing 402, the program simply returns to the procedure illustrated in FIG. 5.

Alternatively, if the original program is playing, the program then obtains the position of the original program 406. The position relates to a time stamp or other positional information of the original program. The system then checks to see if a new content file is assigned to that position on the original program 408. If a new content file is assigned, the system checks to determine if the new content file is playing in sync with the original content 412. If the original program and new content are playing in sync, the program returns to the beginning of the diagram 400. If the original program and new content are not playing in sync 412, the program calculates the correct playback position of the new content and resumes playing back the new content at the new position 414. The program then returns to the beginning of the diagram.

If no new content file has been assigned to the current original program position (as determined above and illustrated as element 408), the system checks to see if any new content file is playing. If a new content file is playing, the system stops playback 426 of the new content file and returns to determine if the original program is playing 400. If no content file is playing 424, the program simply returns to determine if the original program is playing 400. It should be noted that FIG. 4 illustrates a system according to the present invention when the new content is an audio file and no playback adjustments are made to the original program.

Figure 5:
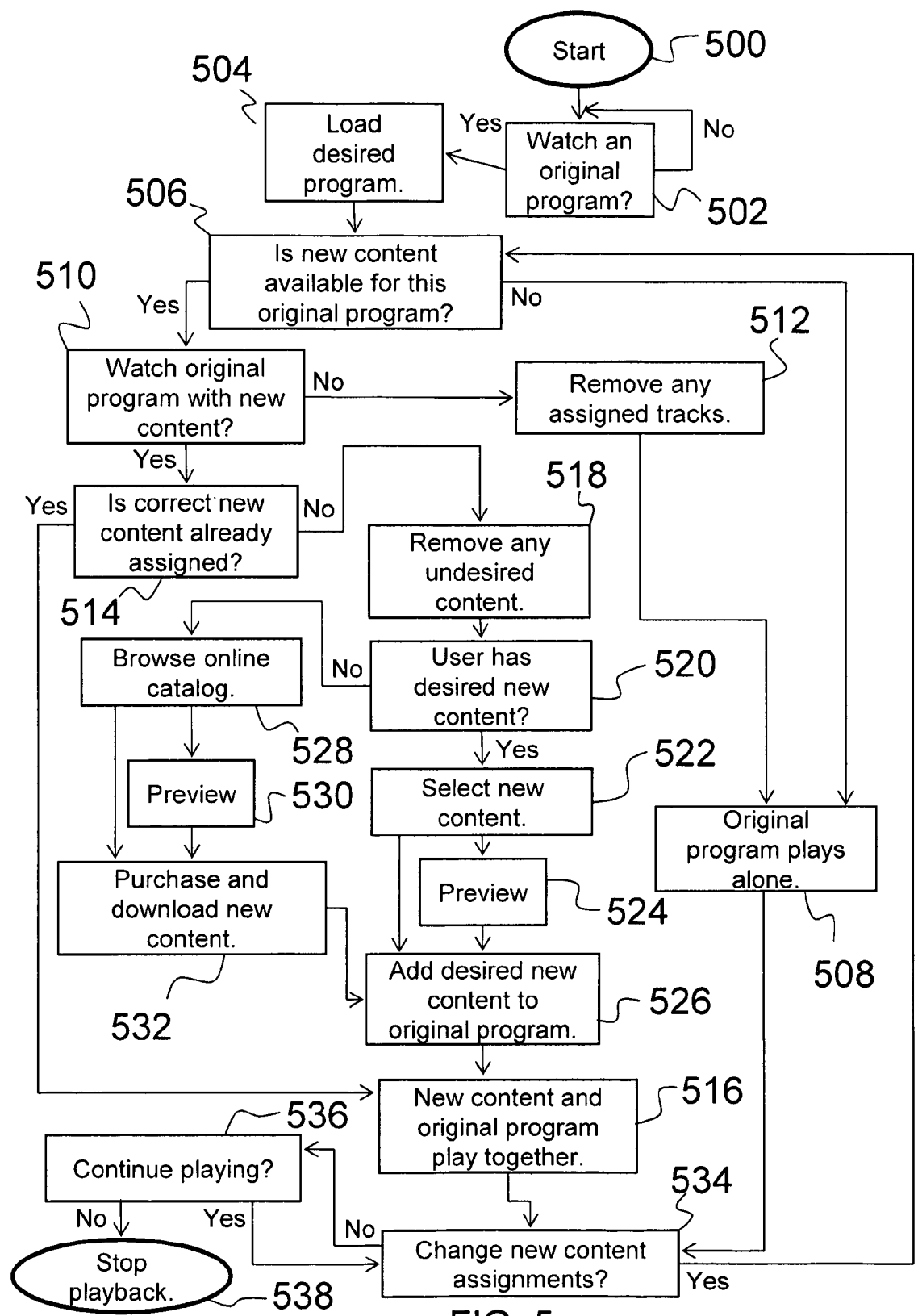
FIG. 5 is a flowchart illustrating an overview of a system for playing a modified program, according to the present invention.

FIG. 5 further illustrates the present invention where the new content includes information other than just audio files (e.g., mashups). FIG. 5 is a flowchart illustrating playback of a modified program according to the present invention. At initiation of the system 500, the system determines if a user would like to watch an original program 502. In other words, a user can be prompted to decide whether or not they would like to watch an original program.

If the user decides to watch an original program, the desired program is loaded 504. It is then determined whether or not new content is available for the original program 506. If new content is not available for the original program, the original program plays alone 508. Alternatively, if new content is available, the system determines whether or not the user wants to watch the original program with the new content (through user prompts) 510. If the user desires to watch the original program without the new content, any previously assigned new content tracks are removed 512, which results in the original program being played alone 508 (without the new content). Alternatively, if the user wants to watch the original program with the new content, it is determined if the correct new content is already assigned 514. This determination, along with the other determinations made herein, is made through user prompts or internal system checks.

If the correct new content is assigned, the system begins playing the new content and the original program together 516 as a modified program. If the new content is an audio file, the modified program is generated and played according to the syncing procedure as illustrated in FIG. 4. If the correct new content is NOT assigned, then the system removes any undesired content from the modified program 518.

With the removal of the undesired content, the system determines if the user currently has the desired new content 520. If the new content is available to the user, the system then allows the user to select the new content 522. The new content can be loaded into the system from the user's computer (or other applicable device), or selected from new content that is already available within the system. Although not required, once selected, the user is given the option of previewing 524 the new content, which is then added to the program 526. Thereafter, the new content and the original program or programs play together as a modified program 516.

However, if the user (or the system) does not possess the desired content 520, the user is provided the opportunity to browse an online catalog 528 of new content. Thus, the present invention also includes an online catalog and internet accessible database of new content that can be merged with an original program to generate a modified program. For example, the user can download voice commentaries, video collages, playback instructions, etc. Additionally, the online catalog and internet accessible database can include a myriad of original programs that are suitable for use with the present invention, such as movies, television programs, etc. Thus, in this aspect, the media playback system is operable for interfacing with the online catalog and allowing a user to add content (to their system) from the online catalog. Although not required, once the new content is identified, the user can preview 530 the new content before purchasing and downloading the new content 532 to the system. Now that the system has the new content, the new content can be added to the original program 526 and thereafter played together with the program 516 as a modified program.

Once the new content and original program(s) are synced and playing together, it can be determined whether or not the user wants to change the new content assignments 534. For example, the user may desire to assign a different new content file with the original program. If the user decides to change the new content assignments, the system determines if new content is available for this program 506. As a non-limiting example, the system performs a query through its memory to retrieve all new content files that are available (in general or for the particular program).

Alternatively, if the user decides to keep the new content assignments, the system continues playing 536 until prompted to stop playback 538. As can be appreciated by one skilled in the art, the determinations made above can be forced through explicit user prompts, through user profiles, through user initiated menu selections, or any other suitable technique for decision making.

Figure 6:
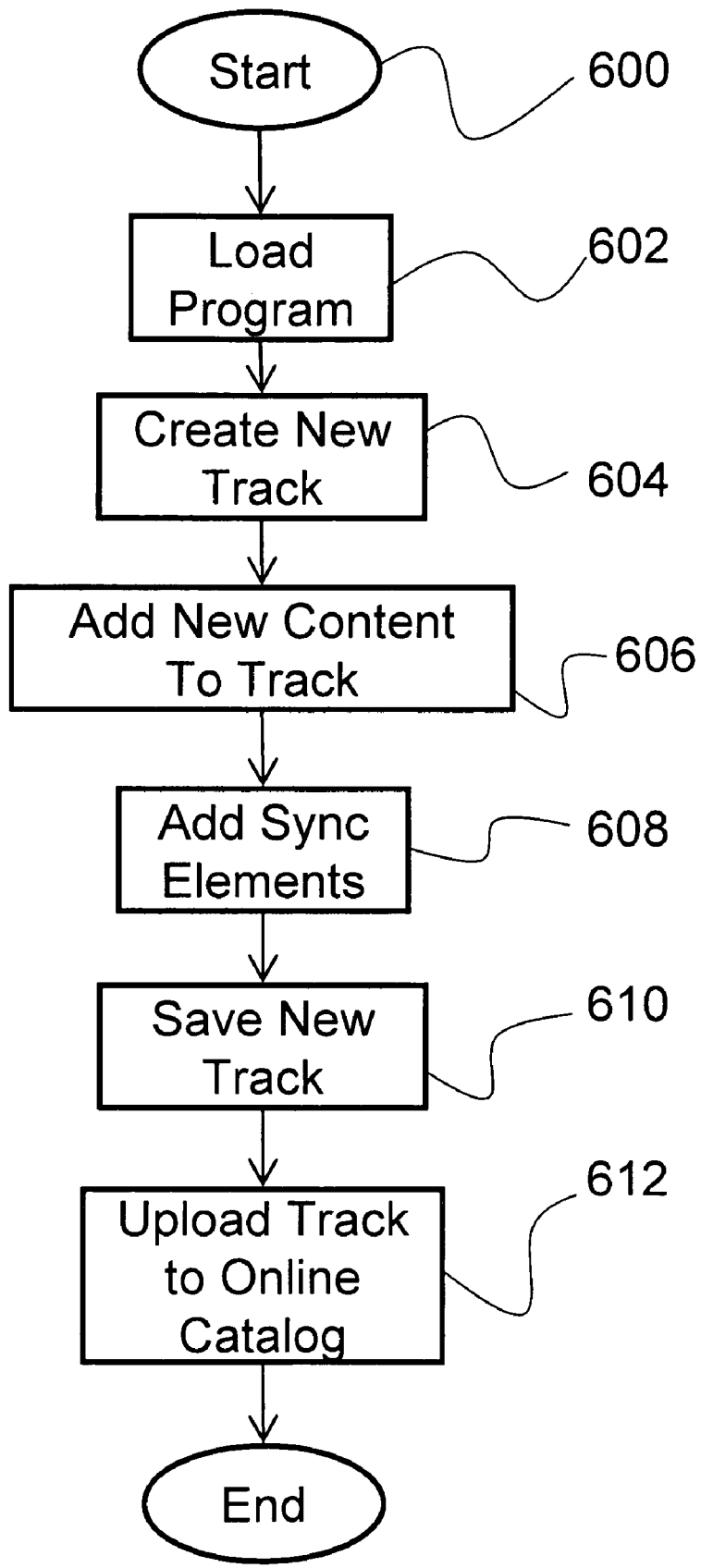
FIG. 6 is a flowchart illustrating a method for creating new content, which can be used in association with an original program in order to generate a modified program, according to the present invention.

Users can also create new content, which can be saved onto a database for use by the user or access by other users. For example, the internet accessible database can be partially generated through uploaded user content, thereby allowing users to swap, buy, contribute, sell, and/or trade new content. As shown in FIG. 6, a user can start 600 the system and thereafter load the original program(s) 602. The system then creates a new track 604, in which a user can add new content to the track 606. As described above, sync elements are added 608 in order to ensure that the new content and original program(s) play in a manner determined by the user who created the new content. With the modified program now complete, the new track can then be saved 610 and uploaded to an online catalog 612 for access by the user and/or other users. It should be noted that the new track does not contain video/audio from the original program(s). The new track only contains timing information about the original programs, as not to violate DRM. Thus, the new track can be a synced new content file that can then be downloaded and used by the user to sync with an original program. For example, a user may possess a DVD of Movie X. The user then decides to create an audio commentary that coincides with Movie X. The user's audio file is then synced with the Movie X as a synced new content file (new track), which collectively operate as a modified program. The new track can then be uploaded to the movie catalog where it can be accessed by other users. Another user, in possession of Movie X, may decide to listen to someone else's commentary and thereafter downloads the new track for syncing and playback with the user's own DVD of Movie X to generate the modified program.

Additionally, listed below are a variety of functional features that can be embodied in the present invention. More specifically, present invention is a system, method, and computer program product that includes a user interface to provide users with the ability to:

- search for content (new content and original programs);
- download/upload new content from/to the internet and/or other computers;
- pay for new content;
- assign multiple streams of new content to an original program;
- assign new content to specific, user-defined portions of an original program;
- control the original program and new content:
  - simultaneously; and/or
  - through a user interface;
- play the original program and new content in sync, as determined by the user's playback preferences or the playback parameters of the new content;
- play the original program with or without the accompanying new content;
- play the new content with or without an accompanying original program;
- change, adjust, or remove the playback parameters of the original program and the new content;
- control the audio of the original program and the new content separately (or simultaneously);
- create, save, load, import and export new content, which can include:
  - information about the original program;
  - media files;
  - information about the new content;
  - information about the media files;
  - user defined playback parameters for both the original program and the new content;
  - information from the new content and original program, which define how elements will be played back "in sync;" and
  - other user defined information;
- define the playback parameters of the original program, non-limiting examples of which include:
  - start times, such as in-point(s) in the original program;
  - end times, such as out-point(s) in the original program; and
  - duration of the assigned portion(s) of the original program;
- define the playback parameters of the new content, non-limiting examples of which include:

start times, such as in-point(s) of the new content file(s);
end times, such as out-point(s) of the new content file(s);
duration of the assigned portion(s) of the new content file(s); and
time ramping of the new content file(s);
change the appearance of the original program by:
  combining the image with elements from the new content; or
  via playback preferences specified in the new content; or
  via playback preferences specified by the user; and
  playing synced audio/visual elements independently of each other;
change the chronology of the original program, by:
  changing scene order by dictating an order in which portions of the original program are to be played; and
  skipping scenes;
change the playback speed of the original program, by:
  creating fast-motion and slow-motion effects;
  reversing the playback; and
  creating freeze-frames;
change the audio of the original program, by:
  volume changes (e.g., ducking); and
  audio effects (e.g., reverb, equalizer, and pitch shift);
change the audio of the new content, by:
  volume changes (e.g., ducking); and
  audio effects (e.g., reverb, equalizer, and pitch shift);
play multiple streams of new content with an original program;
play elements from multiple original programs together;
merge multiple streams of new content and original programs into one media stream;
alter the appearance of the original program or new content through the application of effects which can alter the position, orientation, size, shape, color levels or luminance of the image;
defining a descriptive element for the new content, including:
  a new content name;
  a descriptive summary of the new content;
  a list of compatible original programs;
  generator's (i.e., creator) identification information;
  duration of the new content; and
  price of the new content;
change the viewing experience of an original program, without altering the original program itself;
change the viewing experience of an original program, in a way that does not violate pre-existing copyright laws or DRM;
play new content and original content together in a way that does not violate pre-existing DRM;
create and distribute new content for an original program in a manner that does not violate pre-existing DRM or copyright law;
obtain and log information about the original program, the new content, and their playback parameters, on the user's own system or in the internet accessible database;
monitor, trigger, control, and maintain the in sync playback of an original program and the corresponding new content, including:
  monitoring the original program's position, and determining if that point falls within an assigned portion of a new content file(s);
  using information from the original program, the new content, and the user's preferences to calculate the correct playback position within the new content; and
  executing playback commands of the original program and the new content file(s) to cause them to operate together and play in sync.

As described above, the present invention is a media playback system that syncs an original program with new content and provides a variety of features for use with new content. Also as described above, the original program and new content can be in the form of a variety of media elements. For example, in addition to (or instead of) syncing the original program with an audio file, the original program can be synced with a graphical form of media. For example, the new content can be video overlays, such as subtitled, picture-in-picture, graphics, and advertisements. In another aspect, the new content can be in the form of commands or alterations to the original program to provide a variety of color effects, such as adjustments to the color levels or luminance of the original program.

As yet another example, the new content can come in the form of commands or alterations to the image set forth in the original program, such as by flipping or moving the image. This is accomplished by commands within the software system (new content) to apply the appropriate effect onto the original program, which results in the modified image. As can be appreciated by one skilled in the art, such alterations to an original program can be accomplished using filters or effects, similar to those that can be found in modern day editing systems. Non-limiting examples of such systems include editing software as produced by Avid Technologies, Inc. and Apple's "Final Cut" editing software. Avid Technologies is located at Avid Technology Park, One Park West, Tewksbury, Mass. 01876, United States. As mentioned above, Apple, Inc. is located at One Infinite Loop, Cupertino, Calif. 95014, United States.

As another example, the new content can come in the form of commands or alterations to the chronology of the original program, such as skipping scenes, playing scenes out of order, slow-motion effects, or playing synced audio/visual elements separately. For example, the new content would contain a set of instructions that detail the specific order, duration, speed and qualities of each clip from the original program. In editing terms, this list is called an Edit Decision List (EDL). The system would then take this EDL information from within the new content. The system could then playback clips from the original program in the order and duration the EDL specified. A non-limiting example of a simplified EDL may appear as follows:

| Shot | Start Time code | End Time code | Video | Audio | Speed |
|---|---|---|---|---|---|
| 1 | 1:00:50 | 1:00:53 | yes | yes | 100% |
| 2 | 2:20:45 | 2:20:55 | yes | no | 50% |
| 3 | 2:15:15 | 2:17:20 | yes | yes | 100% |

When a user works, an EDL is automatically created. The EDL contains a detailed list of all the information necessary to playback the original program(s) and new content in the manner the user intended. However, the EDL does not contain any video or audio from the original program, as that would likely violate copyright or DRM. The EDL is stored as part of the new content. The original program is stored separately. Upon playback, the software retrieves this information from within the new content, and displays clips from the original program(s) in accordance with the instructions. Although this may alter the appearance of the original program to the user, the original program remains unaltered.

Figure 7:
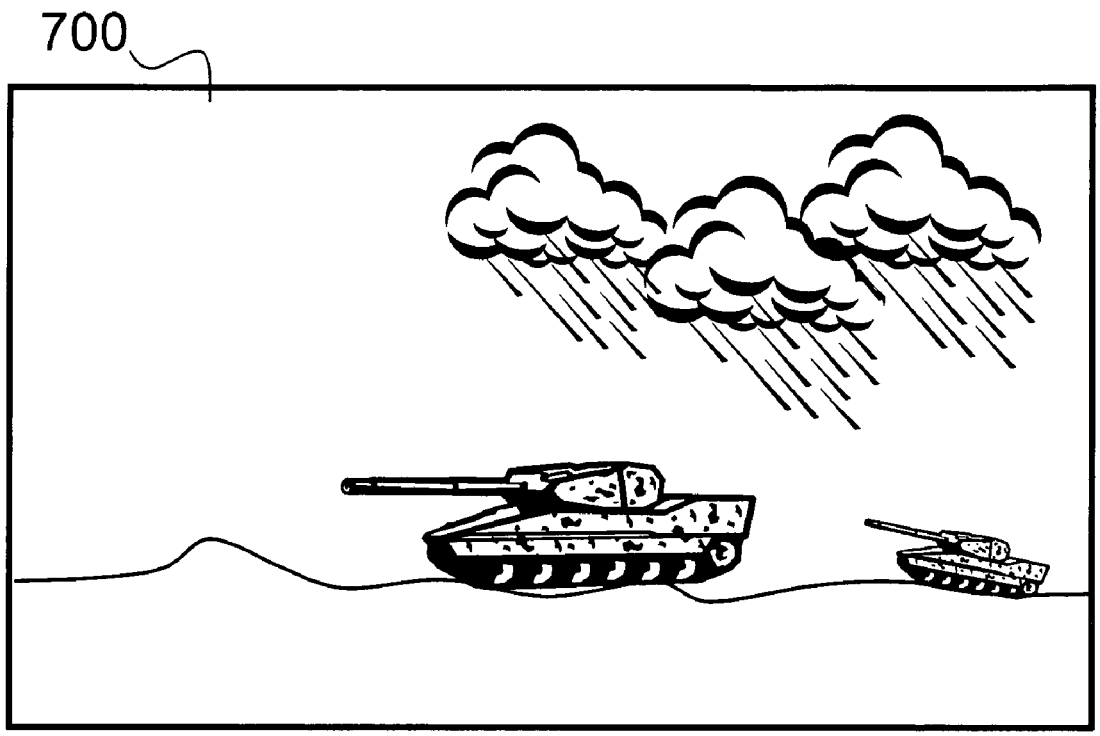
FIG. 7 is an illustration of a snapshot in a video sequence of an original program.

Additionally, as mentioned above, graphical new content can be synced to play with the original program. Further details of such graphical new content are illustrated below. As a starting reference, FIG. 7 is an illustration of a snapshot taken from a video sequence of an original program 700 (an unaltered image). Given the graphical nature of the present invention, the system is configured to allow a user to alter the graphical presentation of the original program through the addition of new content.

Figure 8:
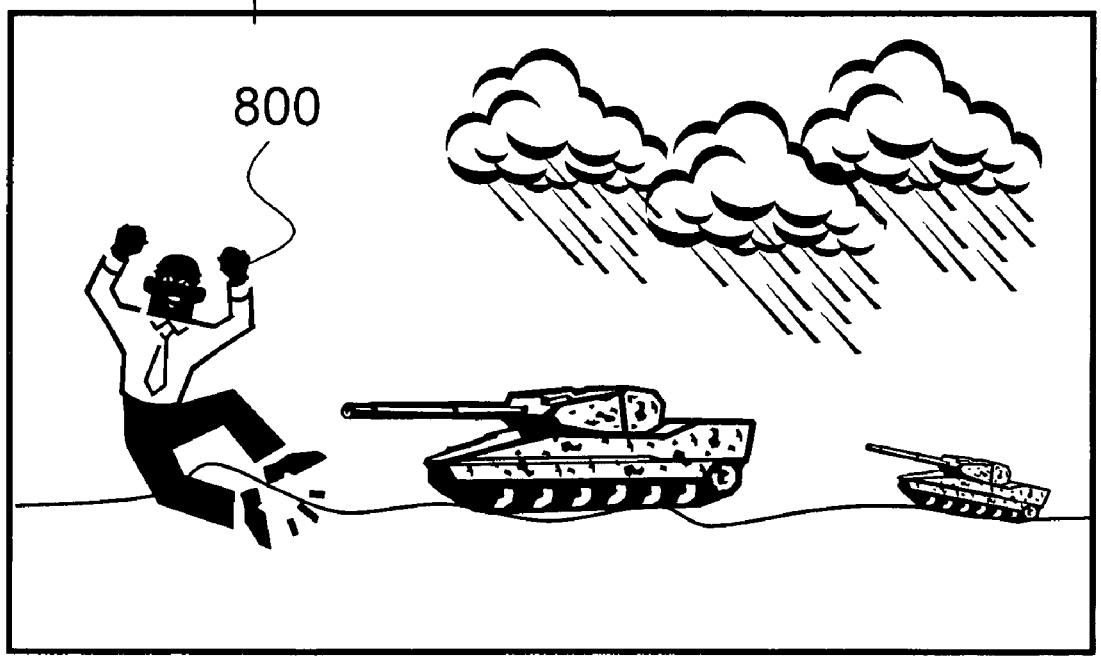
FIG. 8 is an illustration of an original program with a new content graphical overlay.

For example and as illustrated in FIG. 8, the new content can be in the form of an image overlay 800. Collectively, the image overlay 800 and the original program 700 constitute the modified program according to the present invention. Thus, in this example, the modified program is a composite image in which visual elements from additional content (in this case, a person wearing a hat) are combined with the original program's image, creating a new image. The image overlay 800 can be a static image or a video sequence. The image overlay is added to the original program using any suitable technique for splicing two images together. The new content can contain information such as a matte, alpha channel or keyable element, which is used to composite the image overlay 800 onto the original program 700. Thus, users can seamlessly combine new visual elements with any original program, giving the appearance of being part of the original program.

Figure 9:
FIG. 9 is an illustration of an original program with a new content text overlay.

As another example and as illustrated in FIG. 9, the new content can be in the form of text commentary (or subtitles) 900. Thus, a user can add visual comments to any portion of the original program 700.

Figure 10:
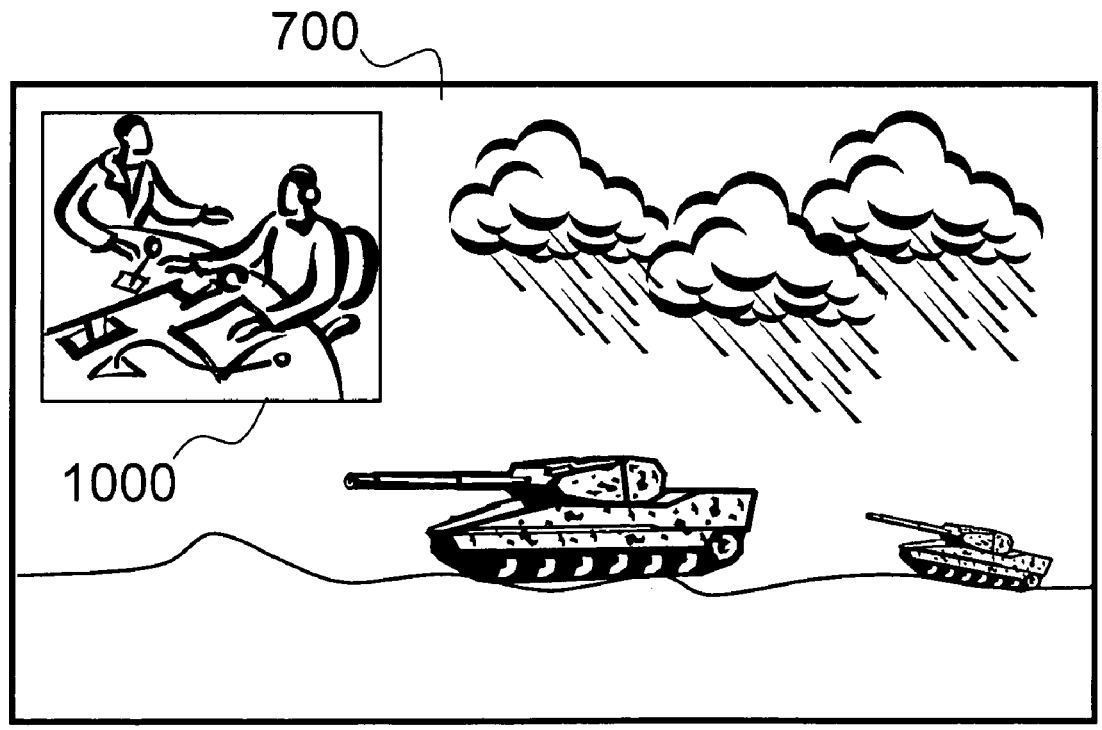
FIG. 10 is an illustration of an original program with a new content video overlay, shown as a picture-in-picture.

FIG. 10 illustrates yet another application of the present invention. In this aspect, the new content is a moving video, such as a picture-in-picture 1000 which is superimposed over the original program 700. In addition to a picture-in-picture 1000, the new content may also include more complex video elements, where the shape and size change over time. Thus, the system can be used to incorporate additional dynamic elements into existing movies and television shows.

Figure 11:
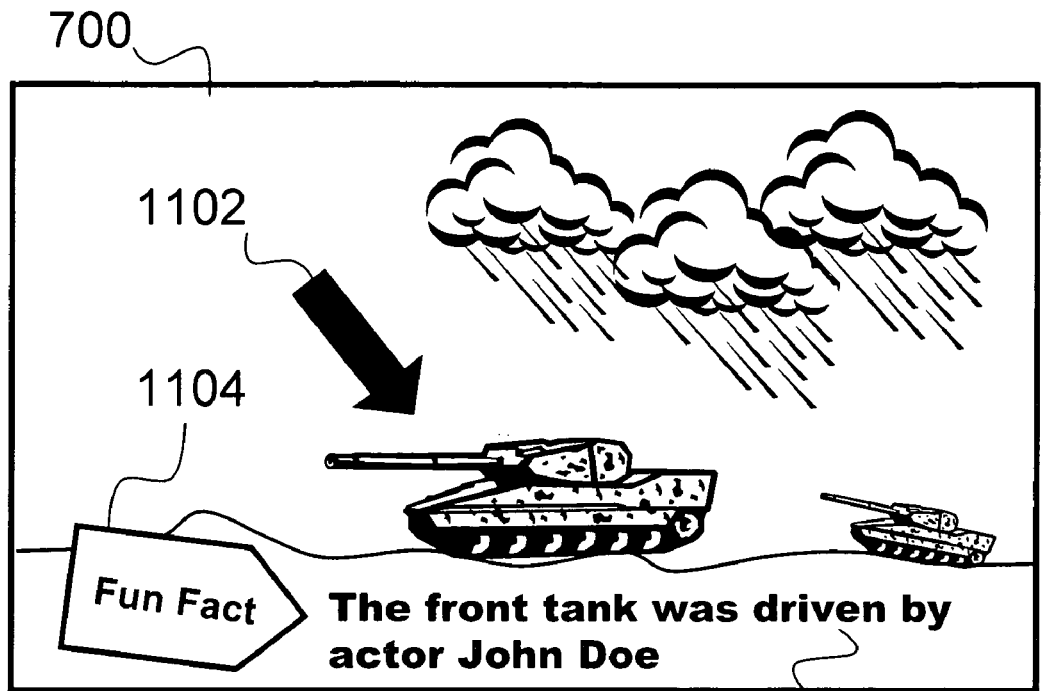
FIG. 11 is an illustration of an original program with both graphical and text overlays.

FIG. 11 is another example of the addition of still graphics and other forms of new content. For example, FIG. 11 illustrates the addition of both text 1100 and graphic overlays 1102 and 1104 to the original program 700.

Figure 12:
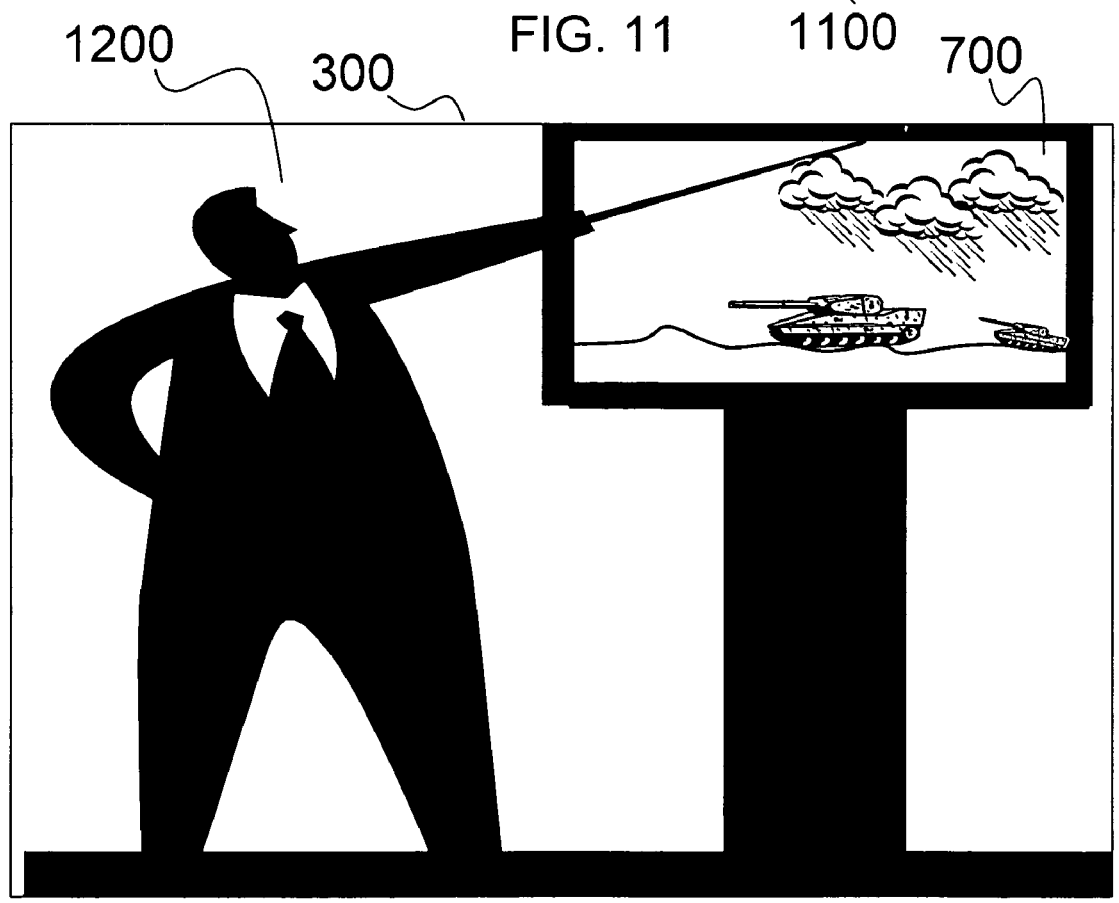
FIG. 12 is an illustration of image manipulation where the original program is depicted as a subset of the new content.

The examples illustrated above show the simple addition of graphical elements to the original program 700. In another aspect and as shown in FIG. 12, the original program 700 can be manipulated in any suitable form to operate with the new content 1200. For example, the original program 700 can be resized and reshaped such that it appears to be a subset of the new content 1200. In this case, the new content 1200 occupies the majority of the display window 300, with the original program 700 being framed as a subset of the new content 1200. This can be accomplished through a variety of techniques. These can involve mattes, alpha channels or keyable elements, which can be used to composite the new content and original content together.

Figure 13:
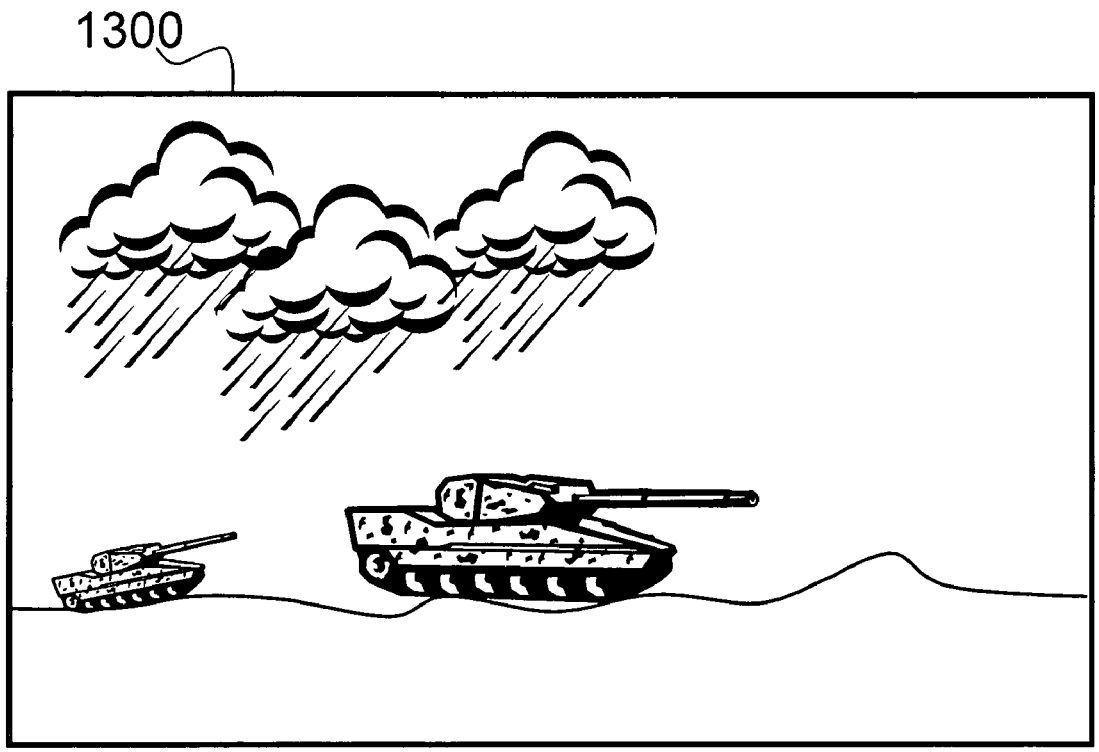
FIG. 13 is an illustration of image manipulation, where the original program is reversed.

FIG. 13 illustrates another feature of the present invention. In this aspect, the new content operates as a command to alter and manipulate the image. Non-limiting examples of such image manipulation includes changes of orientation, size, shape and color values of the original program. Thus, FIG. 13 depicts the modified program 1300 after the image manipulation (change in orientation) has occurred.

Figure 14:
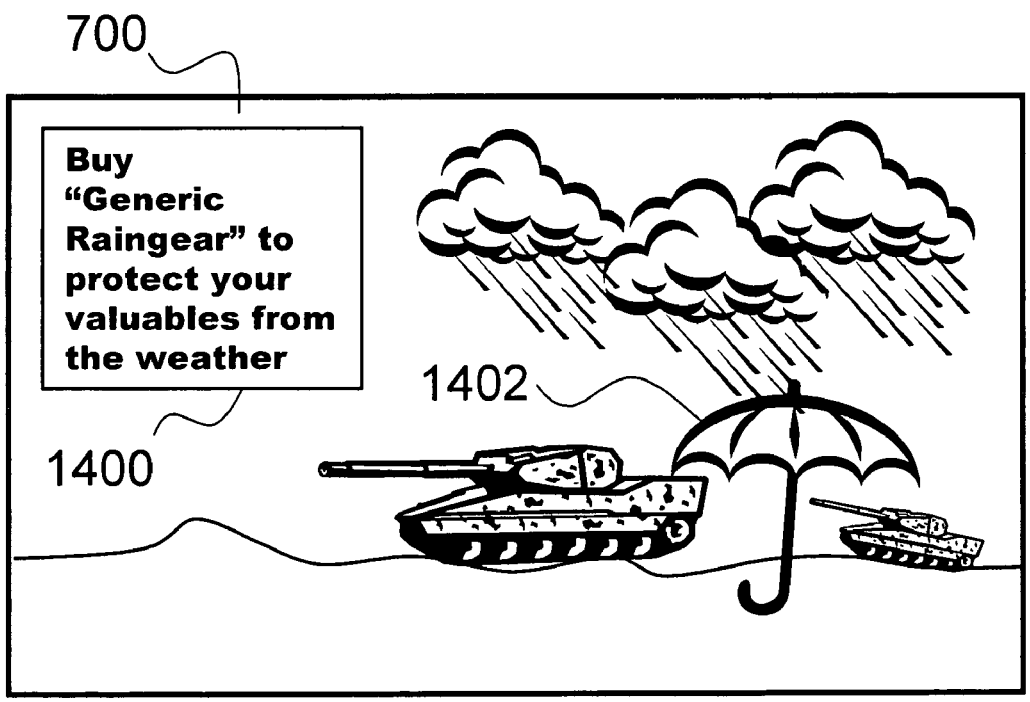
FIG. 14 is an illustration of an original program that has been modified by the inclusion of commercial new content, such as both text and graphical advertisements.

Finally, the present invention also provides a method by which businesses or individuals may profit by creating additional content for any program. This may include the sale and distribution new content or the inclusion of advertising elements. The advertising elements can be in the form of pop-up graphics, text advertisements, image overlays (which composite an ad-sponsored image onto the original program), image manipulation, and/or audio elements. For example and as illustrated in FIG. 14, an advertisement text overlay 1400 and a product image overlay 1402 can be combined with the original program's 700 image to create the new image (modified program).

Thus, as can be appreciated by one skilled in the art, the present invention is a dynamic system that allows users to alter the original program in a variety of forms, including the addition of both audio and graphical new content. Additionally, the system allows a user to generate and acquire commands that alter how an original program is played (without altering the original program itself).

What is claimed is:

1. A method for playing media, comprising acts of:
 acquiring new content having playback preferences that determine how an original program(s) should be played;
 assigning the new content to an original program;
 playing the original program as determined by the playback preferences, whereby a user, using the playback preferences, can play the original program according to the playback preferences;
further comprising acts of:
 determining if a user desires to watch an original program, if yes, then loading the original program;
 determining if new content is available for the original program;
  if new content is not available, then playing the original program alone;
  if new content is available, then determining if the user desires to watch the original program with the new content;
   if the user desires to watch the original program without the new content, then removing any assigned new content tracks and playing the original program alone;
   if the user desires to watch the original program with the new content, then determining if the new content currently available to the original program is correctly assigned to the original program;
    if the new content is correctly assigned to the original program, then playing the new content and original program together;
    if the new content currently available to the original program is incorrectly assigned to the original program, then removing any undesired new content;
 determining if the user possesses desired new content;
  if the user does not possess desired new content, then:
   browsing an internet accessible catalog of new content;
   downloading the desired new content; and
   adding the desired new content to the original program, with the new content and original program thereafter playing together;
  if the user does possess the desired new content, then:
   selecting the desired new content; and
   adding the desired new content to the original program, with the new content and original program thereafter playing together;
 determining if a user desires to change the new content currently added to the original program;
  if the user desires to change the new content, then returning to the act of determining if new content is available for the original program; and if the user does not desire to change the new content, then either continuing playback or stopping playback.

2. A method according to claim 1, further comprising an act of generating new content.

3. A method according to claim 2, wherein the act of generating new content further comprises acts of:
- creating at least one media element, the media element being selected from a media group consisting of audio, graphics, text, and video;
- defining a playback preference of the new content, the playback preference including playback information selected from a group consisting of:
  - information which indicates a start time and stop time of each media element;
  - information dictating an order in which the new content is to be played;
  - information defining how the original program and the new content will be played together;
  - information defining volume levels of each media element;
  - information defining an image alteration of the new content, the image alteration being selected from a group consisting of an orientation effect, re-size effect, shape change effect, reposition effect, color level change effect and a luminance change effect;
  - information defining playback speeds and directions of the new content, the playback speed and direction being selected from a group consisting of slow-motion, freeze-frame, fast-motion, and reverse-play;
  - information defining an audio alteration of the new content; and
- defining a descriptive element for the new content, the descriptive element being selected from a group consisting of a new content name, a descriptive summary of the new content, a list of compatible original programs, generator's identification information, duration of the new content, and price of the new content.

4. A method according to claim 2, wherein the act of generating new content further comprises acts of:
- defining a playback preference of the original program, the playback preference including playback information selected from a group consisting of:
  - information which indicates how the original program will be played in association with the new content;
  - information dictating an order in which portions of the original program are to be played;
  - information including instructions as set forth in an Edit Decision List;
  - information defining volume levels of the original program(s);
  - information defining an image alteration of the original program, the image alteration being selected from a group consisting of an orientation effect, re-size effect, shape change effect, reposition effect, color level change effect and a luminance change effect;
  - information defining a playback speed and direction of the original program, the playback speed and direction being selected from a group consisting of slow-motion, freeze-frame, fast-motion, and reverse-play; and
  - information defining an audio alteration of the original program.

5. A method as set forth in claim 1, wherein the act of determining if new content is available for the original program further comprises an act of checking the original program against an internet accessible database having a catalog of new content for syncing with original programs to determine if new content exists for the original program.

6. A method as set forth in claim 1, wherein the act of acquiring new content further comprises an act of downloading the new content from an internet accessible database.

7. A method as set forth in claim 6, wherein the act of acquiring new content further comprises an act of purchasing the new content from an internet accessible database for download from the internet accessible database.

8. A method as set forth in claim 1, wherein the act of acquiring new content, the new content includes a media element selected from a group consisting of:
- an audio commentary that is formed to play in conjunction with the original program;
- a video overlay that plays in conjunction with the original program such that it plays superimposed over the original program; and
- an advertisement that plays in conjunction with the original program.

9. A method as set forth in claim 8, wherein in the act of acquiring new content where the new content includes an advertisement, the advertisement includes both a video image and a text overlay that collectively play in conjunction with and superimposed over the original program.

10. A method as set forth in claim 1, wherein the act of acquiring new content, the new content includes instructions that alter a playback of the original program, where the original program includes an appearance, audio, a playback chronology, and a playback speed, and wherein the instructions are selected from a group consisting of:
- instructions that alter the appearance of the original program;
- instructions that alter the audio of the original program;
- instructions that alter the playback chronology of the original program; and
- instructions that alter the playback speed of the original program.

11. A method as set forth in claim 1, wherein the act of acquiring new content, the new content includes an appearance, audio, a playback chronology, and a playback speed, and where the new content includes instructions selected from a group consisting of:
- instructions that alter the appearance of the new content;
- instructions that alter the audio of the new content;
- instructions that alter the playback chronology of the new content;
- instructions that alter the playback speed of the new content;
- instructions that combine elements from multiple original programs such that the multiple original programs are combined and play together as a modified program.

12. A method as set forth in claim 1, further comprising an act of assigning multiple streams of new content to an original program such that the multiple streams of new content and the original program are combined and played together as a modified program.

13. A method as set forth in claim 1, further comprising an act of assigning multiple streams of new content to multiple original programs such that the multiple streams of new content and the original programs are combined into a singular playback stream.

14. A method as set forth in claim 1, further comprising acts of:
- generating new content that is formed to play in sync with the original program; and
- uploading the new content to an internet accessible database for use by other users.

15. A method as set forth in claim 1, further comprising acts of:
- acquiring new content for playback with an original program;
- acquiring playback preferences that determine how the new content should be played;
- assigning the new content to the original program, as determined by the playback preferences; and
- playing the new content and original program together as determined by the playback preferences.

16. A method according to claim 1, further comprising an act of acquiring an original program.

17. A computer program product for playing media, the computer program product comprising computer-readable instruction means encoded on a non-transitory computer-readable medium for causing a computer to perform operations of:
- acquiring new content having playback preferences that determine how an original program(s) should be played;
- assigning the new content to an original program; and
- playing the original program as determined by the playback preferences, whereby a user, using the playback preferences, can play the original program according to the playback preferences;
- further comprising instruction means for causing a computer to perform operations of:
- determining if a user desires to watch an original program, if yes, then loading the original program;
- determining if new content is available for the original program;
  - if new content is not available, then playing the original program alone;
  - if new content is available, then determining if the user desires to watch the original program with the new content;
    - if the user desires to watch the original program without the new content, then removing any assigned new content tracks and playing the original program alone;
    - if the user desires to watch the original program with the new content, then determining if the new content currently available to the original program is correctly assigned to the original program;
      - if the new content is correctly assigned to the original program, then playing the new content and original program together;
      - if the new content currently available to the original program is incorrectly assigned to the original program, then removing any undesired new content;
- determining if the user possesses desired new content;
  - if the user does not possess desired new content, then:
    - browsing an internet accessible catalog of new content;
    - downloading the desired new content; and
    - adding the desired new content to the original program, with the new content and original program thereafter playing together;
  - if the user does possess the desired new content, then:
    - selecting the desired new content; and
    - adding the desired new content to the original program, with the new content and original program thereafter playing together;
- determining if a user desires to change the new content currently added to the original program;
  - if the user desires to change the new content, then returning to the act of determining if new content is available for the original program; and
  - if the user does not desire to change the new content, then either continuing playback or stopping playback.

18. A computer program product according to claim 17, further comprising instruction means for causing a computer to generate new content.

19. A computer program product according to claim 18, wherein in generating new content, the computer program product further comprise instruction means for causing the computer to perform operations of:
- creating at least one media element, the media element being selected from a media group consisting of audio, graphics, text, and video;
- defining a playback preference of the new content, the playback preference including playback information selected from a group consisting of:
  - information which indicates a start time and stop time of each media element;
  - information dictating an order in which the new content is to be played;
  - information defining how the original program and the new content will be played together;
  - information defining volume levels of each media element;
  - information defining an image alteration of the new content, the image alteration being selected from a group consisting of an orientation effect, re-size effect, shape change effect, reposition effect, color level change effect and a luminance change effect;
  - information defining playback speeds and directions of the new content, the playback speed and direction being selected from a group consisting of slow-motion, freeze-frame, fast-motion, and reverse-play;
  - information defining an audio alteration of the new content; and
- defining a descriptive element for the new content, the descriptive element being selected from a group consisting of a new content name, a descriptive summary of the new content, a list of compatible original programs, generator's identification information, duration of the new content, and price of the new content.

20. A computer program product according to claim 18, wherein in generating new content, the computer program product further comprise instruction means for causing the computer to perform operations of:
- defining a playback preference of the original program, the playback preference including playback information selected from a group consisting of:
  - information which indicates how the original program will be played in association with the new content;
  - information dictating an order in which portions of the original program are to be played;
  - information including instructions as set forth in an Edit Decision List;
  - information defining volume levels of the original program(s);
  - information defining an image alteration of the original program, the image alteration being selected from a group consisting of an orientation effect, re-size effect, shape change effect, reposition effect, color level change effect and a luminance change effect;
  - information defining a playback speed and direction of the original program, the playback speed and direction being selected from a group consisting of slow-motion, freeze-frame, fast-motion, and reverse-play; and information defining an audio alteration of the original program.

21. A computer program product as set forth in claim 17, wherein when determining if new content is available for the original program, the computer program product further comprises instruction means for causing the computer to check the original program against an internet accessible database having a catalog of new content for syncing with original programs to determine if new content exists for the original program.

22. A computer program product as set forth in claim 17, further comprising instruction means for causing a computer to download the new content from an internet accessible database.

23. A computer program product as set forth in claim 17, further comprising instructions means for causing a computer to allow for the purchase and download of the new content from an internet accessible database.

24. A computer program product as set forth in claim 17, further comprising instruction means for causing a computer to acquire new content that includes a media element selected from a group consisting of:

an audio commentary that is formed to play in conjunction with the original program;

a video overlay that plays in conjunction with the original program such that it plays superimposed over the original program; and an advertisement that plays in conjunction with the original program.

25. A computer program product as set forth in claim 17, further comprising instruction means for causing a computer to acquire new content that includes an advertisement, the advertisement includes both a video image and a text overlay that collectively play in conjunction with and superimposed over the original program.

26. A computer program product as set forth in claim 17, further comprising instruction means that cause a computer to alter a playback of the original program according to a set of instructions, where the original program includes an appearance, audio, a playback chronology, and a playback speed, and wherein the instructions are selected from a group consisting of:

instructions that alter the appearance of the original program;

instructions that alter the audio of the original program;

instructions that alter the playback chronology of the original program; and instructions that alter the playback speed of the original program.

27. A computer program product as set forth in claim 17, further comprising instruction means that cause a computer to alter a playback of the new content according to a set of instructions, where the new content includes an appearance, audio, a playback chronology, and a playback speed, and wherein the instructions are selected from a group consisting of:

instructions that alter the appearance of the new content;
instructions that alter the audio of the new content;
instructions that alter the playback chronology of the new content;
instructions that alter the playback speed of the new content;

instructions that combine elements from multiple original programs such that the multiple original programs are combined and play together as a modified program.

28. A computer program product as set forth in claim 17, further comprising instruction means for causing a computer to assign multiple streams of new content to an original program such that the multiple streams of new content and the original program are combined and played together as a modified program.

29. A computer program product as set forth in claim 17, further comprising instruction means for causing a computer to assign multiple streams of new content to multiple original programs such that the multiple streams of new content and the original programs are combined into a singular playback stream.

30. A computer program product as set forth in claim 17, further comprising instruction means for causing a computer to perform operations of:

generating new content that is formed to play in sync with the original program; and uploading the new content to an internet accessible database for use by other users.

31. A computer program product as set forth in claim 17, further comprising instruction means for causing a computer to perform operations of:

acquiring new content for playback with an original program;

acquiring playback preferences that determine how the new content should be played;

assigning the new content to the original program, as determined by the playback preferences; and playing the new content and original program together as determined by the playback preferences.

32. A computer program product according to claim 17, further comprising instruction means for causing a computer to acquire an original program.

33. A data processing system for playing media, the data processing system comprising:

a memory and one or more processors;

the memory having instructions encoded thereon such that upon execution of the instructions the one or more processors perform operation of:

acquiring new content having playback preferences that determine how an original program(s) should be played;
assigning the new content to an original program; and
playing the original program as determined by the playback preferences, whereby a user, using the playback preferences, can play the original program according to the playback preferences;

the data processing system being further configured to perform operations of:

determining if a user desires to watch an original program, if yes, then loading the original program;

determining if new content is available for the original program;

if new content is not available, then playing the original program alone;

if new content is available, then determining if the user desires to watch the original program with the new content;

if the user desires to watch the original program without the new content, then removing any assigned new content tracks and playing the original program alone;

if the user desires to watch the original program with the new content, then determining if the new content currently available to the original program is correctly assigned to the original program;
if the new content is correctly assigned to the original program, then playing the new content and original program together;
if the new content currently available to the original program is incorrectly assigned to the original program, then removing any undesired new content;
determining if the user possesses desired new content;
if the user does not possess desired new content, then:
browsing an internet accessible catalog of new content;
downloading the desired new content; and
adding the desired new content to the original program, with the new content and original program thereafter playing together;
if the user does possess the desired new content, then:
selecting the desired new content; and
adding the desired new content to the original program, with the new content and original program thereafter playing together;
determining if a user desires to change the new content currently added to the original program;
if the user desires to change the new content, then returning to the act of determining if new content is available for the original program; and
if the user does not desire to change the new content, then either continuing playback or stopping playback.

34. A data processing system according to claim 33, the data processing system being further configured to perform an operation of generating new content.

35. A data processing system according to claim 34, wherein in generating new content, the data processing system is further configured to perform operations of:
creating at least one media element, the media element being selected from a media group consisting of audio, graphics, text, and video;
defining a playback preference of the new content, the playback preference including playback information selected from a group consisting of:
information which indicates a start time and stop time of each media element;
information dictating an order in which the new content is to be played;
information defining how the original program and the new content will be played together;
information defining volume levels of each media element;
information defining an image alteration of the new content, the image alteration being selected from a group consisting of an orientation effect, re-size effect, shape change effect, reposition effect, color level change effect and a luminance change effect;
information defining playback speeds and directions of the new content, the playback speed and direction being selected from a group consisting of slow-motion, freeze-frame, fast-motion, and reverse-play;
information defining an audio alteration of the new content; and
defining a descriptive element for the new content, the descriptive element being selected from a group consisting of a new content name, a descriptive summary of the new content, a list of compatible original programs, generator's identification information, duration of the new content, and price of the new content.

36. A data processing system according to claim 34, wherein in generating new content, the data processing system is further configured to perform operations of:
defining a playback preference of the original program, the playback preference including playback information selected from a group consisting of:
information which indicates how the original program will be played in association with the new content;
information dictating an order in which portions of the original program are to be played;
information including instructions as set forth in an Edit Decision List;
information defining volume levels of the original program(s);
information defining an image alteration of the original program, the image alteration being selected from a group consisting of an orientation effect, re-size effect, shape change effect, reposition effect, color level change effect and a luminance change effect;
information defining a playback speed and direction of the original program, the playback speed and direction being selected from a group consisting of slow-motion, freeze-frame, fast-motion, and reverse-play; and
information defining an audio alteration of the original program.

37. A data processing system as set forth in claim 33, the data processing system being further configured to perform an operation of checking the original program against an internet accessible database having a catalog of new content for syncing with original programs to determine if new content exists for the original program.

38. A data processing system as set forth in claim 33, the data processing system being further configured to perform an operation of downloading the new content from an internet accessible database.

39. A data processing system as set forth in claim 33, the data processing system being further configured to perform an operation of allowing a user to purchase the new content from an internet accessible database for download from the internet accessible database.

40. A data processing system as set forth in claim 33, the data processing system being further configured to perform an operation of acquiring new content that includes a media element selected from a group consisting of:
an audio commentary that is formed to play in conjunction with the original program;
a video overlay that plays in conjunction with the original program such that it plays superimposed over the original program; and
an advertisement that plays in conjunction with the original program.

41. A data processing system as set forth in claim 33, the data processing system being further configured to perform an operation of acquiring new content that includes an advertisement, the advertisement including both a video image and a text overlay that collectively play in conjunction with and superimposed over the original program.

42. A data processing system as set forth in claim 33, the data processing system being further configured to perform an operation of acquiring new content that includes instructions that alter a playback of the original program, where the original program includes an appearance, audio, a playback chronology, and a playback speed, and wherein the instructions are selected from a group consisting of:

instructions that alter the appearance of the original program;
instructions that alter the audio of the original program;
instructions that alter the playback chronology of the original program; and
instructions that alter the playback speed of the original program.

43. A data processing system as set forth in claim 33, the data processing system being further configured to perform an operation of acquiring new content that includes instructions that alter a playback, where the new content includes an appearance, audio, a playback chronology, and a playback speed, and wherein the instructions are selected from a group consisting of:
instructions that alter the appearance of the new content;
instructions that alter the audio of the new content;
instructions that alter the playback chronology of the new content;
instructions that alter the playback speed of the new content;
instructions that combine elements from multiple original programs such that the multiple original programs are combined and play together as a modified program.

44. A data processing system as set forth in claim 33, the data processing system being further configured to perform an operation of assigning multiple streams of new content to an original program such that the multiple streams of new content and the original program are combined and played together as a modified program.

45. A data processing system as set forth in claim 33, the data processing system being further configured to perform an operation of assigning multiple streams of new content to multiple original programs such that the multiple streams of new content and the original programs are combined into a singular playback stream.

46. A data processing system as set forth in claim 33, the data processing system being further configured to perform operations of:
generating new content that is formed to play in sync with the original program; and
uploading the new content to an internet accessible database for use by other users.

47. A data processing system as set forth in claim 33, the data processing system being further configured to perform operations of:
acquiring new content for playback with an original program;
acquiring playback preferences that determine how the new content should be played;
assigning the new content to the original program, as determined by the playback preferences; and
playing the new content and original program together as determined by the playback preferences.

48. A data processing system according to claim 33, the data processing system being further configured to perform an operation of acquiring an original program.

* * * * *